United States Patent
Zhang

(10) Patent No.: US 9,326,113 B2
(45) Date of Patent: Apr. 26, 2016

(54) NETWORK DEVICE, CALLED TERMINAL, AND METHOD FOR PROCESSING THIRD-PARTY CALL

(71) Applicant: Huawei Device Co., LTD, Shenzhen (CN)

(72) Inventor: Linlin Zhang, Shanghai (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 300 days.

(21) Appl. No.: 13/895,823

(22) Filed: May 16, 2013

(65) Prior Publication Data

US 2013/0252596 A1    Sep. 26, 2013

Related U.S. Application Data

(63) Continuation of application No. PCT/CN2011/081532, filed on Oct. 29, 2011.

(30) Foreign Application Priority Data

Nov. 16, 2010   (CN) .......................... 2010 1 0545671

(51) Int. Cl.
*H04W 4/16* (2009.01)
*H04M 3/428* (2006.01)
*H04M 3/436* (2006.01)

(52) U.S. Cl.
CPC .............. *H04W 4/16* (2013.01); *H04M 3/4288* (2013.01); *H04M 3/436* (2013.01); *H04M 2203/2011* (2013.01)

(58) Field of Classification Search
CPC .......... H04W 4/16; H04M 2203/2011; H04M 3/4288; H04M 3/436
See application file for complete search history.

(56) References Cited

U.S. PATENT DOCUMENTS

| 5,636,269 A | 6/1997 | Eisdorfer |
| 5,671,236 A | 9/1997 | Denissen et al. |
| 6,519,335 B1 * | 2/2003 | Bushnell ................. 379/215.01 |
| 2004/0092252 A1 | 5/2004 | Gustavsson et al. |
| 2005/0141462 A1 * | 6/2005 | Aerrabotu et al. ............ 370/335 |
| 2006/0171422 A1 | 8/2006 | Xue et al. |

(Continued)

FOREIGN PATENT DOCUMENTS

| CN | 1115932 A | 1/1996 |
| CN | 1540998 A | 10/2004 |

(Continued)

OTHER PUBLICATIONS

Written Opinion of the International Searching Authority received in Application No. PCT/CN2011/081532 mailed Feb. 9, 2012, 11 pages.

(Continued)

*Primary Examiner* — Marcos Torres
(74) *Attorney, Agent, or Firm* — Slater & Matsil, L.L.P.

(57) ABSTRACT

A method for a network device to process a third-party call can be applied in a scenario where a third party originates a call when a called terminal is in a call process. The network device extracts a calling phone number of the third party and notifies the calling phone number to the called terminal. The called terminal has activated a call waiting service. The network device receives a processing suggestion on the third-party call returned by the called terminal and processes the third-party call according to the processing suggestion.

2 Claims, 4 Drawing Sheets

(56) References Cited

U.S. PATENT DOCUMENTS

| | | |
|---|---|---|
| 2007/0049257 A1* | 3/2007 | Patel et al. ................ 455/414.1 |
| 2008/0009262 A1 | 1/2008 | Rudolf et al. |
| 2012/0039464 A1 | 2/2012 | Xu et al. |

FOREIGN PATENT DOCUMENTS

| | | |
|---|---|---|
| CN | 1801866 A | 7/2006 |
| CN | 101056432 A | 10/2007 |
| CN | 101310509 A | 11/2008 |
| CN | 101444118 A | 5/2009 |
| CN | 101521867 A | 9/2009 |
| CN | 101662753 A | 3/2010 |
| CN | 101883346 A | 11/2010 |
| CN | 101997999 A | 3/2011 |
| JP | 10022897 A | 1/1998 |
| JP | 11-127477 A | 5/1999 |
| JP | 2005538599 A | 12/2005 |
| JP | 2007089212 | 4/2007 |
| WO | WO 98/54871 | 12/1998 |

OTHER PUBLICATIONS

First Office Action of Chinese Application No. 201010545671.8 mailed Oct. 29, 2012, mailed Oct. 29, 2012, 27 pages. (Partial Translation).

Chinese Search Report received in Application No. 201010545671.8 mailed Oct. 21, 2012, 2 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.6.0, Dec. 2011, 194 pages.

International Search Report and Written Opinion received in Application No. PCT/CN2012/071389, mailed Dec. 16, 2012, 12 pages.

Extended European Search Report received in Application No. 11841930.8-1858 mailed Aug. 6, 2013, 6 pages.

International Search Report received in International Application No. PCT/CN2011/081532 mailed Feb. 9, 2012, 4 pages.

\* cited by examiner

NETWORK DEVICE, CALLED TERMINAL, AND METHOD FOR PROCESSING THIRD-PARTY CALL

CROSS-REFERENCE TO RELATED APPLICATIONS

This application is a continuation of International Application No. PCT/CN2011/081532, filed on Oct. 29, 2011, which claims priority to Chinese Patent Application No. 201010545671.8, filed on Nov. 16, 2010, both of which are hereby incorporated by reference in their entireties.

TECHNICAL FIELD

The present invention relates to the field of mobile communications and, in particular embodiments, to a method for processing a third-party call.

BACKGROUND

At present, in a general mobile communication service, when terminal A and terminal B are in an ordinary voice call process, the terminal A cannot answer a call from a third-party terminal C. At this time, the ring back tone received by the third party is "The user you dialed is busy now. Please redial later." In this case, the network determines that the terminal A is in a call process, and plays a ring back tone indicating that the called party is busy to the terminal C to directly deny the access of the terminal C. The called terminal A has no right to make a selection and the decision right depends on the network device.

To solve the above problem, the prior art provides a technical solution for call waiting. When the user of the terminal A has activated a call waiting service and is in a call process with the terminal B, if the third-party terminal C pages the terminal A, the network does not distinguish the calling party but directly delivers the paging request to the called terminal A. The terminal A receives a prompt information about the incoming call from the terminal C, and may select to answer or deny the call from the terminal C. Once the terminal A selects to deny the call, the terminal C does not know the specific reason why the terminal A denies the call, which brings a poor user experience to the terminal C. Once the user enables the call waiting service the called terminal cannot screen the access of a low-priority user; the user of the terminal A needs to manually judge whether to allow the access of the terminal C. The user needs to perform operations manually in the call process, which may cause many invalid access attempts in case of no management. If the low-priority user is denied, the denied user has a poorer experience than denied by the network.

SUMMARY OF THE INVENTION

Embodiments of the present invention provide a network device, a called terminal, and a method for processing a third-party call, which are used to manage the third-party call.

To solve the above technical problem, the present invention provides a method for a network device to process a third-party call, which is applied in a scenario where a third party originates a call when a called terminal is in a call process. In this method, the network device extracts a calling phone number of the third party then notifies the calling phone number of the third party to the called terminal. The called terminal has activated a call waiting service. The network device receives a processing suggestion on the third-party call returned by the called terminal and processes the third-party call according to the processing suggestion on the third-party call.

An embodiment of the present invention also provides a method for a called terminal to process a third-party call, which is applied in a scenario where a third party originates a call when the called terminal is in a call process with a peer number. The method includes: receiving, by the called terminal, a calling phone number of the third party delivered by a network device, and determining a priority of the calling phone number of the third party and a priority of the peer number, where the called terminal has activated a call waiting service; and comparing the priority of the calling phone number of the third party with the priority of the peer number, determining a processing suggestion on the third-party call according to the comparison result, and sending the processing suggestion on the third-party call to the network device so that the network device processes the third-party call according to the processing suggestion on the third-party call.

An embodiment of the present invention also provides a network device, which is applied in a scenario where a third party originates a call when a called terminal is in a call process. The network device includes a judging module, a number extracting and sending module, and a processing module. The judging module is configured to send a request for extracting a calling phone number of the third party to the number extracting and sending module when determining that the called terminal has activated a call waiting service and is in a call process; the number extracting and sending module is configured to extract the calling phone number of the third party according to the request of the judging module and send the calling phone number to the called terminal; and the processing module is configured to receive a processing suggestion on the third-party call returned by the called terminal and process the third-party call according to the processing suggestion on the third-party call.

An embodiment of the present invention also provides a called terminal, which is applied in a scenario where a third party originates a call when the called terminal is in a call process with a peer number. The called terminal includes a receiving and parsing module, a priority determining module, a result determining module, and a result sending module. The receiving and parsing module is configured to receive a calling phone number of the third party delivered by a network device; the priority determining module is configured to determine a priority of the calling phone number of the third party and a priority of the peer number; the result determining module is configured to compare the priority of the calling phone number of the third party with the priority of the peer number, and determine a processing suggestion on the third-party call according to the comparison result, and the result sending module is configured to send the processing suggestion on the third-party call to the network device so that the network device processes the third-party call according to the processing suggestion on the third-party call.

Compared with the prior art, the present invention determines the processing suggestion on the third-party call by comparing the priority of the calling phone number of the third party with the priority of the peer number, manages the third-party call, and improves the user experience while avoiding invalid access.

BRIEF DESCRIPTION OF THE DRAWINGS

To illustrate the technical solutions in the embodiments of the present invention or in the prior art more clearly, the accompanying drawings required for describing the embodiments or the prior art are introduced briefly in the following. Apparently, the accompanying drawings in the following description merely show some embodiments of the present invention, and persons of ordinary skill in the art can derive other drawings from the accompanying drawings without creative efforts.

DETAILED DESCRIPTION OF ILLUSTRATIVE EMBODIMENTS

To make the objectives, technical solutions, and advantages of the present invention more comprehensible, the following describes the present invention in detail with reference to accompanying drawings and exemplary embodiments. Embodiments of the present invention provide a method for processing a third-party call and provide a corresponding network device and called terminal. The embodiments of the present invention are hereinafter described in detail respectively.

Figure 1:
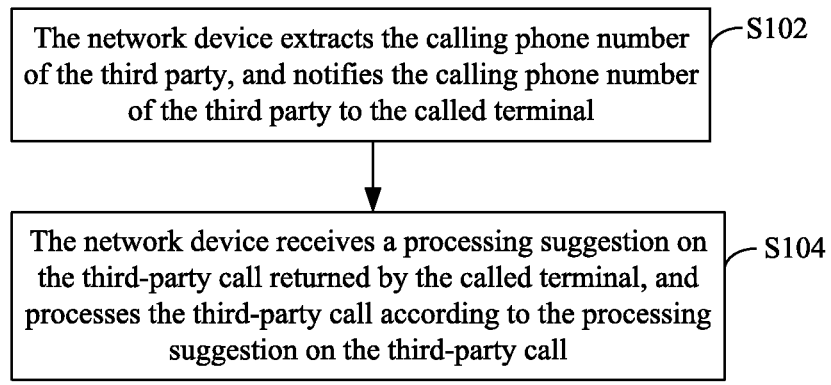
FIG. 1 is a flowchart of a method for a network device to process a third-party call according to a first embodiment of the present invention.

FIG. 1 is a flowchart of a method for a network device to process a third-party call according to a first embodiment of the present invention.

The method is applied in a scenario where a third party originates a call when a called terminal is in a call process. In this case, the sender of a call request is a third party, and the call originated by the third party is a third-party call. When the call from the third party is received, the method for a network device to process a third-party call includes the following steps.

S102. The network device extracts the calling phone number of the third party, and notifies the calling phone number of the third party to the called terminal, where the called terminal has activated a call waiting service.

The notifying the calling phone number of the third party to the called terminal includes the following: The network device sends the calling phone number of the third party to the called terminal through a first air interface signaling.

When the network device sends the first air interface signaling to the called terminal and waits for a returned message, the third party is in a paging state. The method for extracting the calling phone number of the third party when the network device determines that the called terminal is in a call process is based on the prior art and is not further described herein.

Specifically, delivering the calling phone number of the third party by the network device through the first air interface signaling is implemented by extending the extended display in an FWI (Flash with information) message on a forward traffic channel. The display type field of the extended display is extended and defined as 00000001, and by default, the type indicates that the calling phone number of the third party is delivered in case of call waiting. The field filling rule is:

Display type: 00000001;
Display tag: 10001011;
Display len: number length;
CHARi: calling phone number of the third party.

The called terminal parses the value of the CHARi information element in the FWI message to obtain the calling phone number of the third party.

S104. The network device receives a processing suggestion on the third-party call returned by the called terminal, and processes the third-party call according to the processing suggestion on the third-party call.

The receiving, by the network device, the processing suggestion on the third-party call returned by the called terminal includes the following: The network device receives a second air interface signaling returned by the called terminal and carrying the processing suggestion on the third-party call.

The processing the third-party call according to the processing suggestion on the third-party call includes the following: When the processing suggestion is allowing access of the third-party number, the network device delivers a paging message to the called terminal, and the third-party user hears a ring back tone "The user you dialed is in conversation. Please wait"; when the processing suggestion is denying the access of the third-party number, the network device does not deliver a paging message to the called terminal, but returns a ring back tone indicating that the user is busy, and the third-party user hears the ring back tone indicating that the user is busy, "The user you dialed is busy now. Please redial later."

Specifically, the receiving, by the network device, the second air interface signaling returned by the called terminal and carrying the processing suggestion on the third-party call is implemented by an FWI on a reverse traffic channel. The display type field of the extended display is extended and defined as 00000001, and by default, the type is a field for reporting the processing suggestion on the third-party call in case of call waiting. The field filling rule is as follows:

Display type: 00000001;
Display tag: 10001001;
Display len: 1;
CHARi: 0 or 1 (0 indicates that access is allowed, and 1 indicates that access is denied).

The network device parses the value of the CHARi information element in the FWI message to obtain the processing suggestion on the third-party call.

Figure 2:
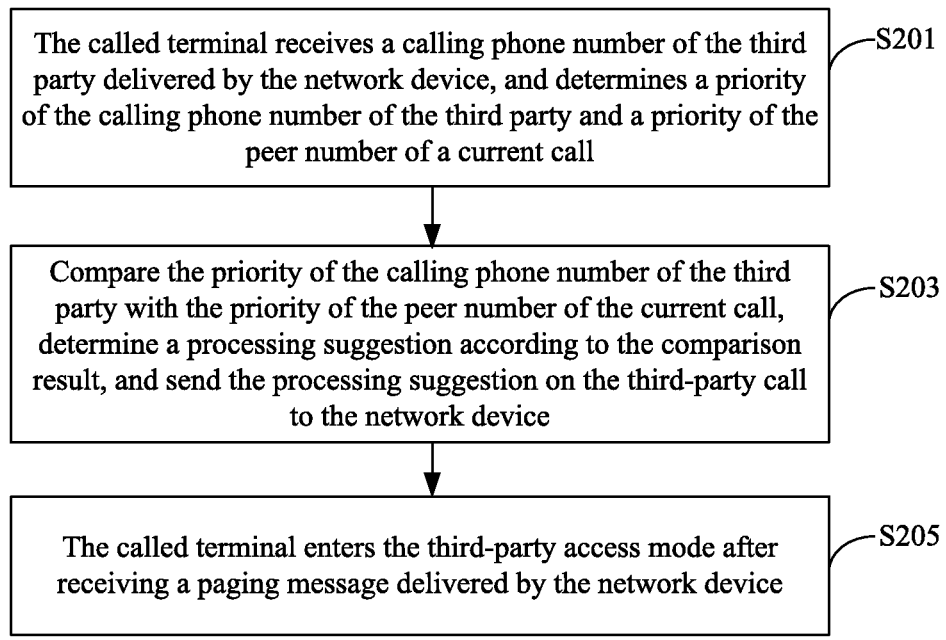
FIG. 2 is a flowchart of a method for a called terminal to process a third-party call according to a second embodiment of the present invention.

FIG. 2 is a flowchart of a method for a called terminal to process a third-party call according to a second embodiment of the present invention.

The method is applied in a scenario where a third-party originates a call when the called terminal is in a call process with a peer number. If a first air interface signaling from a network device is received in the call process of the called terminal, the method for a called terminal to process a third-party call is further included, and the method specifically includes the following:

S201. The called terminal receives a calling phone number of the third party delivered by the network device, and determines a priority of the calling phone number of the third party and a priority of the peer number of a current call, where the called terminal has activated a call waiting service.

The receiving, by the called terminal, the calling phone number of the third party delivered by the network device includes the following: The called terminal receives and parses the first air interface signaling of the network device to obtain the calling phone number of the third party.

The called terminal receives and parses the first air interface signaling of the network device to obtain the calling phone number of the third party in the following way: receiving the FWI message sent by the network device and parsing the CHARi information element in the message to obtain the calling phone number of the third party.

Determining the priority of the calling phone number of the third party and the priority of the peer number of the current call may be finding the priority of the calling phone number of the third party in the phone book of the called terminal and the priority of the peer number of the current call. To implement the embodiment of the present invention, call priorities of the phone numbers in the phone book of the called terminal need to be set, and the levels of priorities may be high, middle, and low, or may be 1, 2, 3, 4, and so on. Further, different priority levels may be set for each number based on time segments, for example, for number 1, the priority may be high during the time segment from 8:00 to 17:00, and is low from 18:00 to 7:00. If no priority level is set in the phone book, or the third-party number is an unknown number that is not stored in the phone book, the number may have the highest priority by default.

S203. Compare the priority of the calling phone number of the third party with the priority of the peer number of the current call, determine a processing suggestion according to the comparison result, and send the processing suggestion on the third-party call to the network device so that the network device processes the third-party call according to the processing suggestion on the third-party call.

The determining the processing suggestion according to the comparison result includes: allowing access of the third-party call when the comparison result is that the priority of the calling phone number of the third party is higher than or equal to the priority of the peer number; and denying the access of the third-party call when the comparison result is that the priority of the calling phone number of the third party is lower than the priority of the peer number.

The sending the processing suggestion on the third-party call to the network device includes sending the second air interface signaling carrying the processing suggestion on the third-party call to the network device.

The second air interface signaling sent by the called terminal is implemented by the FWI on the reverse traffic channel. The display type field of the extended display is extended and defined as 00000001, and by default, the type is a field for reporting the processing suggestion on the third-party call in case of call waiting. The field filling rule is as follows:

Display type: 00000001;
Display tag: 10001001;
Display len: 1;
CHARi: 0 or 1 (0 indicates that access is allowed, and 1 indicates that access is denied).

Optionally, in step S205, after sending the processing suggestion on the third-party call to the network device, the called terminal enters a third-party access mode when receiving a paging message delivered by the network device. Herein the third-party access mode refers to a mode in which the incoming call of the third-party call is allowed when the called terminal is in a call process, so that the called terminal may select one from the original peer party and the third party to talk to; the called terminal receives the paging message delivered by the network device, and enters the third-party access mode, which is based on the prior art and is not further described herein. In a method for processing a third-party call, the above steps S201 and S203 are steps between steps S102 and S104, and step S205 is optional.

Figure 3:
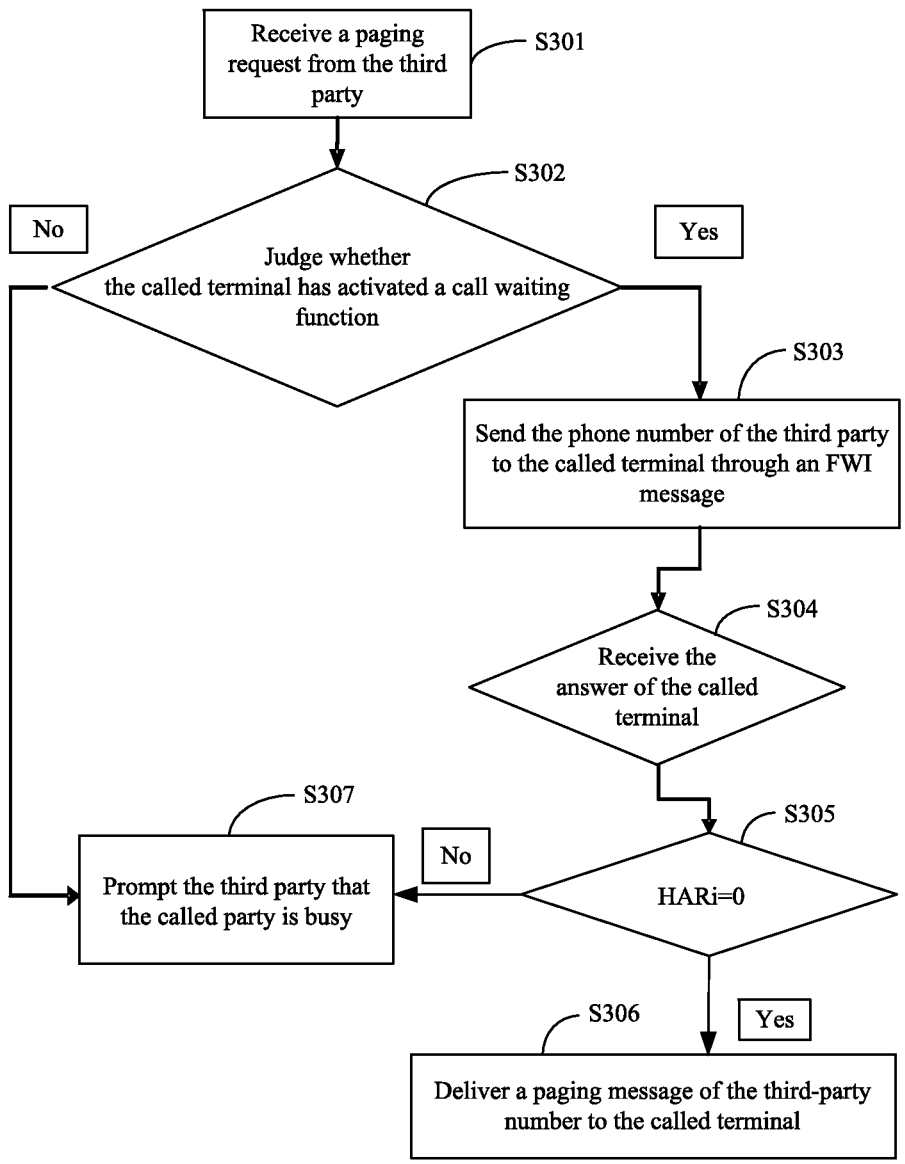
FIG. 3 is a flowchart of a method for a network device to process a third-party call according to a third embodiment of the present invention.

FIG. 3 is a flowchart of a method for a network device to process a third-party call according to a third embodiment of the present invention.

The method is applied in a scenario where a third party originates a call when a called terminal is in a call process. When the call from the third party is received in the call process of the called terminal, the method for a network device to process a third-party call includes the following:

S301. Receive a paging request from the third party.

S302. Judge whether the called terminal has activated a call waiting function, and if not, directly go to step S307, or if so, go to step S303.

S303. Send the calling phone number of the third party to the called terminal through an FWI message.

S304. Receive the answer of the called terminal, and specifically, receive the FWI message returned by the called terminal.

S305. Judge whether CHARi is 0, that is, whether the called terminal allows access of the third-party call, and if so, go to step S306, or if not, go to step S307.

S306. Deliver a paging message of the third party to the called terminal.

S307. Prompt the third party that the called terminal is busy.

Figure 4:
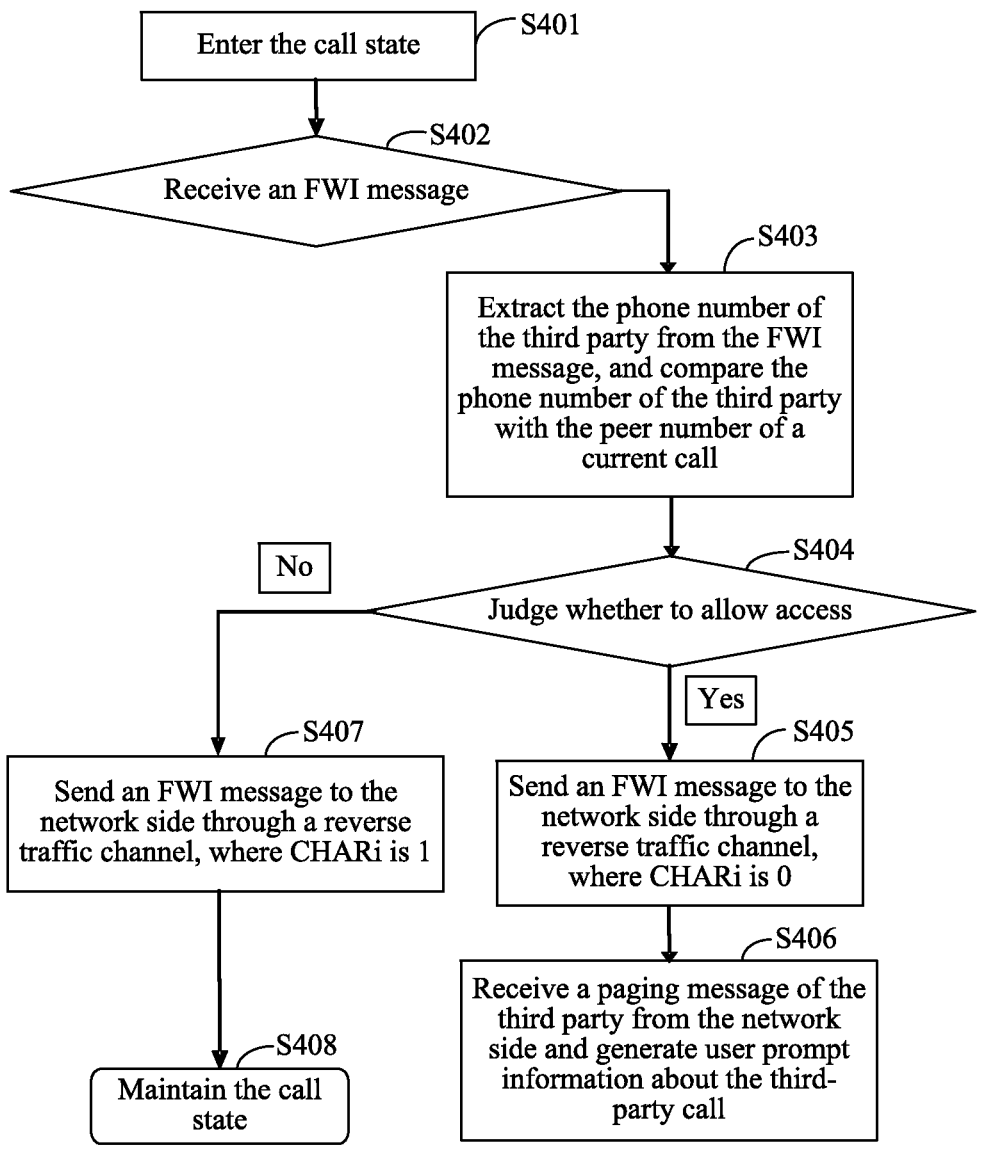
FIG. 4 is a flowchart of a method for a network device to process a third-party call according to a fourth embodiment of the present invention.

FIG. 4 is a flowchart of a method for a called terminal to process a third-party call according to a fourth embodiment of the present invention.

The method is applied in a scenario where a third-party originates a call when the called terminal is in a call process with a peer number. If an FWI message from a network device is received in the call process of the called terminal, the method for a called terminal to process a third-party call is further included, and the method specifically includes the following:

S401. The called terminal enters the call state.

S402. Receive an FWI message.

S403. Extract the calling phone number of the third party from the FWI message, and compare a priority of the calling phone number of the third party with a priority of the peer number of a current call.

S404. Judge, according to the comparison result, whether to allow access of the third party call, and if so, go to step S405, or if not, go to step S407.

S405. Send an FWI message to the network device through a reverse traffic channel, where CHARi is 0.

S406. Receive a paging message of the third party from the network device and generate user prompt information about the third-party call.

S407. Send an FWI message to the network device through a reverse traffic channel, where CHARi is 1.

S408. Maintain the call state.

Figure 5:
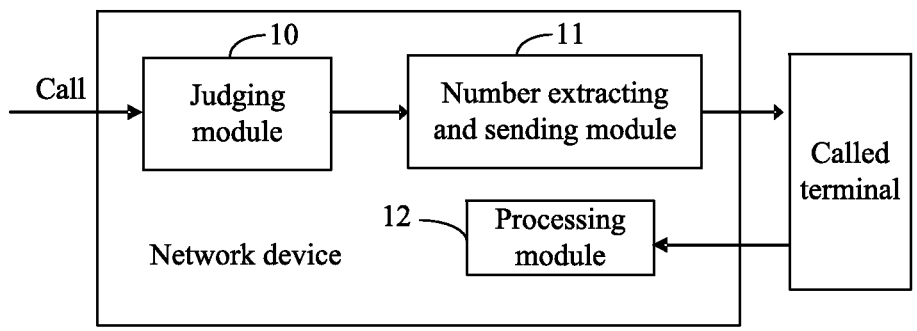
FIG. 5 is a structural block diagram of a network device according to a fifth embodiment of the present invention.

FIG. 5 is a structural block diagram of a network device according to a fifth embodiment of the present invention.

The network device is applied in a scenario where a third party originates a call when a called terminal is in a call process. The network device includes a judging module 10, a number extracting and sending module 11, and a processing module 12. The judging module is configured to send a request for extracting a calling phone number of the third party to the number extracting and sending module when determining that the called terminal has activated a call waiting service and is in a call process; the number extracting and sending module is configured to extract the calling phone number of the third party according to the request of the judging module and send the calling phone number to the called terminal; and the processing module is configured to receive a processing suggestion on the third-party call returned by the called terminal and process the third-party call according to the processing suggestion on the third-party call.

The sending, by the number extracting and sending module, the calling phone number of the third party to the called terminal includes the following: The number extracting and sending module sends the calling phone number of the third party to the called terminal through a first air interface signaling, where the first air interface signaling includes an FWI message on a forward traffic channel, where the FWI message on the forward traffic channel includes a field of the calling phone number of the third party delivered in case of call waiting, and the field includes an information element whose content is the calling phone number of the third party. The receiving, by the processing module, the processing suggestion on the third-party call returned by the called terminal includes the following: The processing module receives a second air interface signaling returned by the called terminal and carrying the processing suggestion on the third-party call, where the second air interface signaling includes an FWI message on a reverse traffic channel, where the FWI message on the reverse traffic channel includes a field for reporting the processing suggestion on the third-party call in case of call waiting and the field includes an information element whose content is the processing suggestion on the third-party call, and the network device parses the information element of the processing suggestion on the third-party call in the FWI message on the reverse traffic channel to obtain the processing suggestion on the third-party call.

The processing the third-party call according to the processing suggestion on the third-party call includes the following: When the processing suggestion is allowing access of the third-party number, the network device delivers a paging message to the called terminal; when the processing suggestion is denying the access of the third-party number, the network device does not deliver a paging message to the called terminal, but returns a ring back tone indicating that the user is busy to the third-party user.

Figure 6:
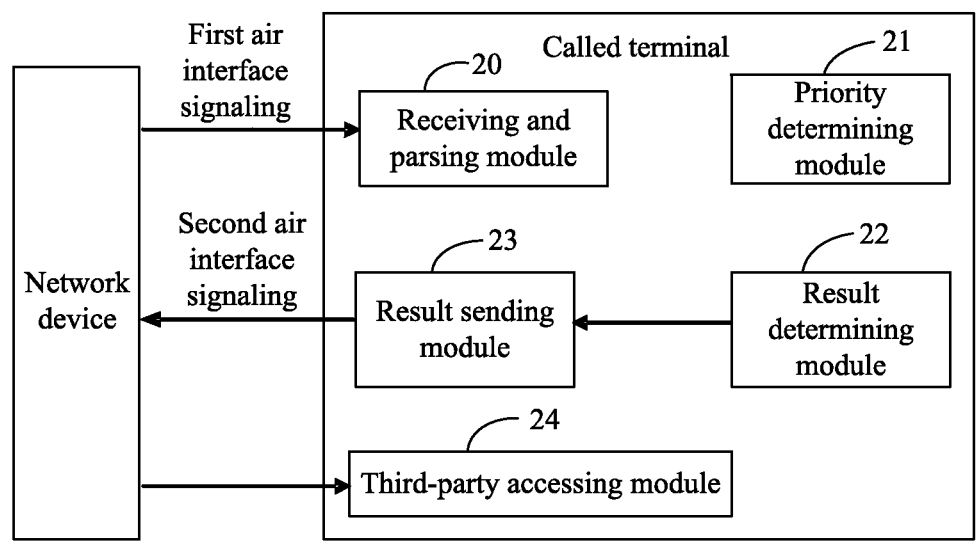
FIG. 6 is a structural block diagram of a called terminal according to a sixth embodiment of the present invention.

FIG. 6 is a structural block diagram of a called terminal according to a sixth embodiment of the present invention.

The called terminal is applied in a scenario where a third party originates a call when the called terminal is in a call process with a peer number. The called terminal includes a receiving and parsing module 20, a priority determining module 21, a result determining module 22, and a result sending module 23. The receiving and parsing module is configured to receive a calling phone number of the third party delivered by a network device; the priority determining module is configured to determine a priority of the calling phone number of the third party and a priority of the peer number; the result determining module is configured to compare the priority of the calling phone number of the third party with the priority of the peer number, and determine a processing suggestion on the third-party call according to the comparison result; and the result sending module is configured to send the processing suggestion on the third-party call to the network device so that the network device processes the third-party call according to the processing suggestion on the third-party call.

Optionally, the called terminal further includes a third-party accessing module 24, configured to enter the third-party access mode when receiving a paging message delivered by the network device after sending the processing suggestion on the third-party call to the network device.

The receiving, by the receiving and parsing module, the calling phone number of the third party delivered by the network device includes the following: The receiving and parsing module receives and parses the first air interface signaling of the network device to obtain the calling phone number of the third party, where the first air interface signaling includes an FWI message on a forward traffic channel, where the FWI message on the forward traffic channel includes a field for delivering the calling phone number of the third party in case of call waiting and the field includes an information element whose content is the calling phone number of the third party. The sending, by the result sending module, the processing suggestion on the third-party call to the network device includes sending the second air interface signaling carrying the processing suggestion on the third-party call to the network device, where the second air interface signaling includes an FWI message on a reverse traffic channel, where the FWI message on the reverse traffic channel includes a field for reporting the processing suggestion on the third-party call in case of call waiting and the field includes an information element whose content is the processing suggestion on the third-party call. The determining, by the priority determining module, the priority of the calling phone number of the third party and the priority of the peer number includes: storing phone numbers and priorities of the phone numbers in the phone book of the called terminal, and searching the phone book of the called terminal to determine the priority of the calling phone number of the third party and the priority of the peer number. The determining, by the result determining module, the processing suggestion according to the comparison result includes: allowing access of the third-party call when the priority of the calling phone number of the third party is higher than or equal to the priority of the peer number; and denying the access of the third-party call when the priority of the calling phone number of the third party is lower than the priority of the peer number.

Persons of ordinary skill in the art may understand that all or a part of the steps in the methods provided by the foregoing embodiments may be implemented by relevant hardware under the instruction of a program. The program may be stored in a computer readable storage medium, such as a read only memory (ROM, Read Only Memory), a random access memory (RAM, Random Access Memory), a magnetic disk, or a CD-ROM.

A network device, a called terminal, and a method for processing a third-party call that are provided in the embodiments of the present invention are introduced in detail in the foregoing. The foregoing descriptions of the embodiments are merely intended to help understand the methods and ideas of the present invention only. Meanwhile, persons of ordinary skill in the art may make modifications to the specific implementation manners and application scopes according to the idea of the present invention. In conclusion, the content of the specification shall not be construed as a limitation to the present invention.

The above descriptions are merely exemplary embodiments of the present invention, but the protection scope of the present invention is not limited thereto. Any modification or replacement that can be easily thought of by persons skilled in the art without departing from the technical scope of the present invention shall fall within the protection scope of the present invention. Therefore, the protection scope of the present invention is subject to the appended claims.

What is claimed is:

1. A network device comprising a processor including a non-transitory computer readable medium storing program modules executable by the processor, the modules comprising:
   a judging module;
   a number extracting and sending module; and
   a processing module;
   wherein the judging module is configured to send a request for extracting a calling phone number of a third party to the number extracting and sending module in response to determining that a called terminal has activated call waiting service and that the called terminal is in a call process when the third party originates a third-party call to the called terminal;

wherein the number extracting and sending module is configured to extract the calling phone number of the third party in response to the request of the judging module and to send the phone number to the called terminal;

wherein the processing module is configured to receive a processing suggestion on the third-party call from the called terminal and to process the third-party call according to the processing suggestion on the third-party call;

wherein the processing module is further configured to process the third-party call by delivering a paging message to the called terminal when the processing suggestion is allowing access by the calling phone number of the third party and returning a ring back tone indicating that a user is busy to a third-party user; and wherein the processing module is further configured to process the third-party call by not delivering the paging message to the called terminal when the processing suggestion is denying the access by the calling phone number of the third party.

2. The network device according to claim 1, wherein the number extracting and sending module is configured to send the calling phone number of the third party to the called terminal by sending the calling phone number of the third party to the called terminal through a first air interface signaling, wherein the first air interface signaling comprises an FWI (Flash with information) message on a forward traffic channel, wherein the FWI message on the forward traffic channel comprises a field for delivering the calling phone number of the third party in case of call waiting and the field comprises an information element whose content is the calling phone number of the third party; and wherein the processing module is configured to receive the processing suggestion via a second air interface signaling returned by the called terminal, wherein the second air interface signaling comprises an FWI message on a reverse traffic channel, wherein the FWI message on the reverse traffic channel comprises a field for reporting the processing suggestion on the third-party call in case of call waiting and the field comprises an information element whose content is the processing suggestion on the third-party call such that the network device parses the information element of the processing suggestion on the third-party call in the FWI message on the reverse traffic channel to obtain the processing suggestion on the third-party call.

* * * * *